No. 736,332. PATENTED AUG. 11, 1903.
C. R. GIBSON.
MILK COOLER.
APPLICATION FILED DEC. 15, 1902.
NO MODEL.
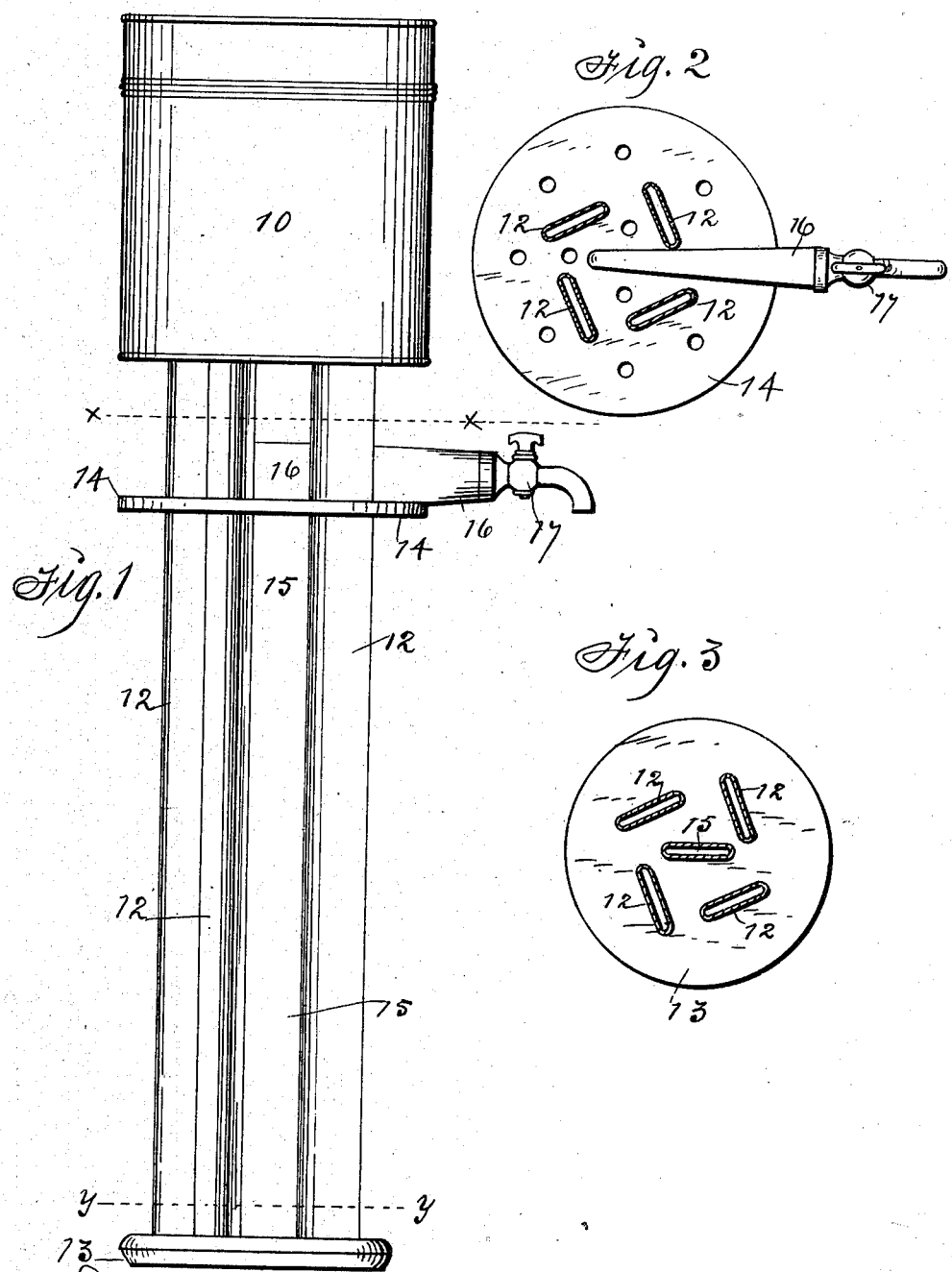
Witnesses:
L. H. Orwig.
Henry Manger.
Inventor: Clinton R. Gibson,
By Thomas G. Orwig, Attorney.
THE NORRIS PETERS CO., PHOTO-LITHO., WASHINGTON, D. C.

No. 736,332. Patented August 11, 1903.

UNITED STATES PATENT OFFICE.

CLINTON R. GIBSON, OF HUMMER, SOUTH DAKOTA.

MILK-COOLER.

SPECIFICATION forming part of Letters Patent No. 736,332, dated August 11, 1903.

Application filed December 15, 1902. Serial No. 135,239. (No model.)

*To all whom it may concern:*

Be it known that I, CLINTON R. GIBSON, a citizen of the United States, residing at Hummer, in the county of Charles Mix and State of South Dakota, have invented a new and useful Milk-Cooler, of which the following is a specification.

My object is to provide a simple, strong, durable, and efficient portable device specially adapted for advantageously extracting animal heat from milk that is designed to be used for dairy purposes.

My invention consists in the construction and combination of flat tubes with a tank, a flat chamber, a fixed cover for a vessel, and a delivery-tube and faucet, as hereinafter set forth, pointed out in my claims, and illustrated in the accompanying drawings, in which—

Figure 1 is a side elevation of my invention, that shows the forms and relative positions of the different parts. Fig. 2 is a transverse sectional view on the line $x$ $x$ of Fig. 1, that shows the flat tubes and the delivery-spout and faucet in a plane above the fixed cover for vessels in which the main and lower portions of the tubes may be placed to contact with milk. Fig. 3 is a transverse sectional view on the line $y$ $y$, that shows the flat tubes so arranged relative to each other as to mutually brace each other, as required to prevent any lateral flexion or bending out of perpendicular lines.

The numeral 10 designates a water-tight sheet-metal tank that may vary in size, as desired. A plurality of flat open-ended sheet-tubes 12 are fixed in corresponding apertures in the bottom of the tank to communicate therewith. To the lower end of the flat tubes is fixed a flat sheet-metal chamber 13, adapted to serve as a foot to support the complete device in a perpendicular position when it is placed on a shelf, floor, or table, and also adapted for increasing the radiating surface that is to impart the temperature of cold water to milk that contacts therewith, as required to expel animal heat from fresh milk that comes in contact with the flat tubes and the flat chamber with which the tubes communicate. By placing the flat tubes at right angles to each other they mutually brace and support each other and strengthen the complete device.

To the upper end portions of the flat tubes 12 is fixed a disk or cover 14, adapted to serve as a means of suspending the flat chamber and tubes in a common milk-tank or other suitable vessel in which milk may be placed, and also adapted to close the top of such a vessel, as required to prevent extraneous matter from falling into the milk in the vessel. Perforations in the cover allow ventilation and the escape of animal heat that is extracted from the milk during the process of cooling it in the vessel.

To the central portion of the closed top of the flat chamber 13 is fixed a flat tube 15 to communicate with the chamber, and its top extends up through the cover 14 and terminates in a delivery-spout 16, that extends therefrom at right angles and has a faucet 17 on its free end.

In the practical use of my invention when warm fresh milk has been placed in a suitable can, tank, or vessel and the milk-cooler placed in the milk and suspended therein by means of the fixed cover 14 cold water is filled in the water-tank 10 and allowed to fill and circulate through the plurality of flat tubes 12 and the flat chamber 13 and to rise through the central flat tube 15 to be discharged through the horizontal delivery-tube 16 and faucet 17 in a plane above the vessel upon which the cover 14 is placed for suspending the milk-cooler in a vessel and also closing the top of the vessel. The cold temperature of the water is thus imparted to the milk as required to cool the milk.

It is obvious ice and ice-water may be placed in a vessel and warm milk or other liquid may be poured in the water-tank 10 and allowed to circulate through the flat tubes and chamber at their lower ends to quickly and advantageously cool it by means of my convenient portable device. It is also obvious that by providing means for closing the outer end of the tube 16 water or milk may be advantageously retained at times in the tank 10 and tubes 12 and 15 and carried about therewith.

Having thus described the purpose of my invention and its construction and operation, the practical utility thereof will be readily understood by persons familiar with the art to which it pertains, and

What I claim as new, and desire to secure by Letters Patent, is—

1. In a milk-cooling device, a water-tight tank, a plurality of flat open-ended tubes fixed in the bottom of the tank in right-angled position to each other and a flat water-tight chamber fixed to the bottom ends of the flat tubes, a flat perforated cover fixed to the top portions of the tubes and a flat open-ended tube fixed to the top and central portion of the flat chamber and extended up through the fixed perforated cover and then at right angles, and means for opening and closing said tube, arranged and combined in the manner set forth for the purposes stated.

2. A portable device for cooling milk and other warm liquids, comprising a water-tight tank, a plurality of flat open-ended sheet-metal tubes fixed in the bottom of the tank, a flat water-tight chamber fixed to the bottom ends of the flat tubes, a flat disk or cover fixed to the upper portions of the flat tubes, a flat open-ended tube fixed to the top and central portion of the top of the flat chamber, a lateral extension at the top of said central tube and a faucet on the end of the extension, arranged and combined as shown and described to operate in the manner set forth for the purposes stated.

CLINTON R. GIBSON.

Witnesses:
 CHAS. T. KYTE,
 CHAS. W. BOWKIN.